J. F. STREIB.
BRAKE MECHANISM.
APPLICATION FILED FEB. 8, 1921.

1,392,368.

Patented Oct. 4, 1921.

UNITED STATES PATENT OFFICE.

JOHN F. STREIB, OF AVALON, PENNSYLVANIA, ASSIGNOR TO PRESSED STEEL CAR COMPANY, OF PITTSBURGH, PENNSYLVANIA, A CORPORATION OF NEW JERSEY.

BRAKE MECHANISM.

1,392,368.      Specification of Letters Patent.      Patented Oct. 4, 1921.

Application filed February 8, 1921. Serial No. 443,374.

*To all whom it may concern:*

Be it known that I, JOHN F. STREIB, a citizen of the United States, residing in Avalon, in the county of Allegheny and State of Pennsylvania, have invented certain new and useful Improvements in Brake Mechanism, of which the following is a specification.

This invention relates to railway car brakes, and has for an object the provision of means for maintaining the brake head and shoe in their proper position relative to the car wheel when the brake is in its released position.

Another object of the invention is to provide a member for maintaining the brake head and brake shoe in its proper position relative to the car wheel when the brake is in released position, such member being carried by the brake beam and being connected with the brake head.

A further object of the invention is to provide a brake head holding member which is slidably mounted on the brake beam and connected with the brake head.

Figure 1:
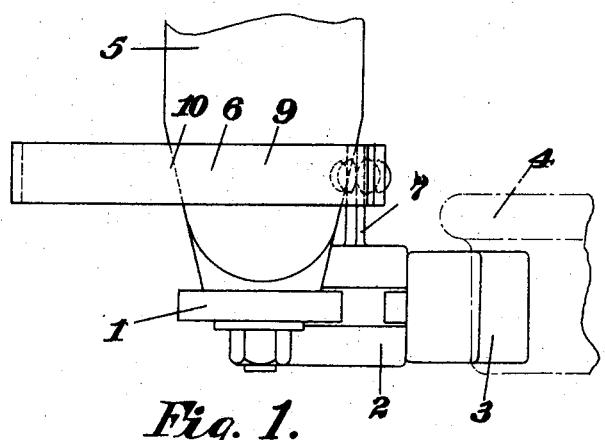
Figure 2:
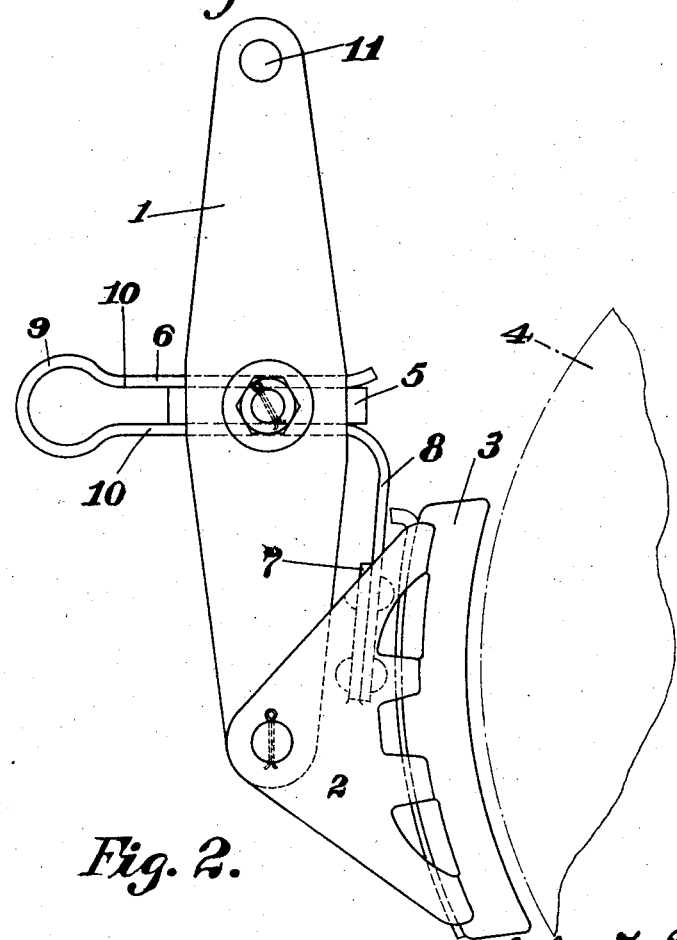

Referring now to the drawing in which like reference characters refer to like parts, Figure 1, is a plan view of a portion of a brake embodying the invention and Fig. 2, is an elevational view of the same.

Referring now in detail to the drawing the reference character 1, indicates a brake lever, either dead or live, which at its lower end has a brake head 2 pivotally connected therewith which head is provided with a brake shoe 3 adapted to engage the wheel 4. Above the brake head a brake beam 5 is pivotally connected with the lever 1, such brake beam being of any suitable cross-section and preferably having flat top and bottom portions at points where a brake head holding member 6 contacts with the beam, such member being hereinafter more fully described.

The brake head 2 is provided with a projection 7 which may be integral with the head as shown or may be made separate therefrom and secured thereto by any suitable means. This projection is connected with an outwardly depending portion 8 of the member 6. The upper portion 9 of this member is made in the form of an open ended loop having parallel portions 10 one of which passes over the beam 4 and the other of which passes under the beam. The beam and member being slidable relative to each other.

Assuming the lever 1 to be a dead lever and pivoted at 11 to a rigid part of the truck or car and the braking power is being applied, the shoe and member 6, will move toward the tread of the wheel a greater distance than will the brake beam and consequently the member 6 will slide on the beam 4 and will maintain the shoe in its proper position relative to the wheel. It will be seen that when it is desired to adjust the brake the top portion of the lever 1 is moved to any other suitable position than that shown in the drawing and as the lever is moved toward adjusted position the brake beam will slide relative to the member 6 and this member will maintain the brake shoe in its proper position relative to the wheel.

Having thus described the invention what I claim as new and desire to secure by Letters Patent is:

1. In a brake for railway cars, a brake lever, a brake beam connected with said lever, a brake head pivotally mounted on said lever and means slidably mounted on said beam adapted to maintain said head in its proper position relative to a car wheel.

2. In a brake for railway cars, a brake lever, a brake beam connected with said lever, a brake head pivotally mounted on said lever below said beam, a member slidably mounted on said beam having a downwardly depending portion connected with said head.

3. In a brake for railway cars, a brake lever, a brake beam pivotally connected with said lever, a brake head pivotally mounted on said lever, and means for holding said head in its proper relation to the car wheel when the brake is released, said means comprising a loop shaped member slidably mounted on said beam and having the downwardly depending portion secured to said head.

4. The combination with a brake lever and a brake beam, of a brake head pivotally connected with said lever below said beam and means connected with said head and slidably mounted on said beam adapted to maintain said head in its proper position relative to the car wheel.

In testimony whereof I affix my signature in the presence of two witnesses.

JOHN F. STREIB.

Witnesses:
    HARRY W. CARBAUGH,
    HELEN A. POWER.